United States Patent
Thoennes et al.

(10) Patent No.: US 7,747,726 B2
(45) Date of Patent: Jun. 29, 2010

(54) METHOD AND APPARATUS FOR ESTIMATING A LOCAL PERFORMANCE INDEX TO MEASURE THE PERFORMANCE CONTRIBUTION OF A SINGLE SERVER IN A MULTI-TIERED ENVIRONMENT

(75) Inventors: Mathew S. Thoennes, West Harrison, NY (US); Peter B. Yocom, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/533,574

(22) Filed: Sep. 20, 2006

(65) Prior Publication Data

US 2008/0071906 A1 Mar. 20, 2008

(51) Int. Cl.
*G06F 15/173* (2006.01)
(52) U.S. Cl. .................. 709/223; 709/225; 718/102; 718/104
(58) Field of Classification Search .................. 709/223
See application file for complete search history.

(56) References Cited

U.S. PATENT DOCUMENTS

| | | | | |
|---|---|---|---|---|
| 5,504,894 | A * | 4/1996 | Ferguson et al. ............... 707/2 |
| 5,675,739 | A * | 10/1997 | Eilert et al. .................. 709/226 |
| 5,923,874 | A | 7/1999 | Koenig ........................ 395/670 |
| 5,958,010 | A * | 9/1999 | Agarwal et al. ............. 709/224 |
| 6,230,183 | B1 * | 5/2001 | Yocom et al. ............... 718/105 |
| 6,639,900 | B1 | 10/2003 | Anstey et al. ................ 370/254 |
| 6,760,910 | B2 * | 7/2004 | Eilert et al. .................. 718/104 |
| 6,871,324 | B2 | 3/2005 | Hand et al. .................. 715/734 |
| 6,961,769 | B2 | 11/2005 | Arora et al. ................. 709/224 |
| 6,985,940 | B1 * | 1/2006 | Jenkin ........................ 709/224 |
| 2001/0039559 | A1 * | 11/2001 | Eilert et al. .................. 709/104 |
| 2003/0145080 | A1 | 7/2003 | Breese et al. ............... 709/224 |
| 2004/0220947 | A1 * | 11/2004 | Aman et al. ................. 707/100 |
| 2005/0021736 | A1 | 1/2005 | Carusi et al. ................ 709/224 |
| 2005/0102398 | A1 * | 5/2005 | Zhang et al. ................ 709/225 |
| 2007/0028068 | A1 * | 2/2007 | Golding et al. ............. 711/170 |
| 2007/0083649 | A1 * | 4/2007 | Zuzga et al. ................. 709/224 |
| 2007/0203910 | A1 * | 8/2007 | Ferguson et al. ............... 707/8 |

* cited by examiner

*Primary Examiner*—Firmin Backer
*Assistant Examiner*—Hamza Algibhah
(74) *Attorney, Agent, or Firm*—William A. Kinnaman, Jr.

(57) ABSTRACT

A method and apparatus for obtaining a local performance measure for a particular server in a particular tier in a transaction environment in which transactions pass through multiple tiers with multiple servers at each tier. The contribution from the particular server to the total end-to-end response time for a set of transactions is scaled by the ratio of transactions passing through the particular tier to transactions passing through the particular server to obtain a scaled contribution from the particular tier. This is added to the contribution from outside the particular tier to obtain a modified total end-to-end response time from the perspective of the particular server. The modified total end-to-end response time is divided by the number of transactions in the set to obtain a modified average end-to-end response time from the perspective of the particular server, which is used to control allocation of resources to the server.

12 Claims, 7 Drawing Sheets ured with ARM on the fly
METHOD AND APPARATUS FOR ESTIMATING A LOCAL PERFORMANCE INDEX TO MEASURE THE PERFORMANCE CONTRIBUTION OF A SINGLE SERVER IN A MULTI-TIERED ENVIRONMENT

CROSS-REFERENCE TO RELATED APPLICATION

This application is related to the commonly owned, concurrently filed application of Jeffrey D. Aman et al., entitled "METHOD AND APPARATUS FOR MANAGING CENTRAL PROCESSING UNIT RESOURCES OF A LOGICALLY PARTITIONED COMPUTING ENVIRONMENT WITHOUT SHARED MEMORY ACCESS", Ser. No. 11/533,558, incorporated herein by reference.

BACKGROUND OF THE INVENTION

1. Field of the Invention

This invention relates to a method and apparatus for estimating a local performance index to measure the performance that is being achieved by work flowing through a particular server in a multi-system tier with multiple tiers. The invention may be utilized in the area of goal-oriented performance management of multi-tiered transaction-based work.

2. Description of the Related Art

Workload management is a computing concept whereby system resources, such as time on a central processing unit (CPU), are redistributed between jobs on a single server or redistributed between servers in accordance with how well certain performance metrics are being met. There are two general approaches in the area of workload management. Both of these approaches assume that the work being managed is running in an environment where the managed work is competing for some common resource. Examples of this include multiple managed pieces of work running on the same operating system instance or multiple operating system instances running on hardware that has been logically partitioned to allow multiple independent instances.

The first approach to workload management is a consumption-based approach. In this approach, a policy is created that describes the resource consumption constraints on particular pieces of work; these constraints are usually defined at an operating system or process boundary. An example of this would be specifying the amount of processor resource (i.e., CPU time) a database application will normally be allowed to consume. The multiple managed entities can then be ranked as to their relative importance to each other. Management can then occur via two different methods. The first is to move resources from "donor" instances that are underutilizing their allocated resources to "receiver" instances that have demand for resources beyond their allocated amount. The receivers may be prioritized by a defined relative importance. The second is to move resources from one instance to another instance even when both are consuming their allocated resource based on the defined relative importance.

The second approach to workload management, to which the present invention is directed, is a goal-oriented approach. Here, the policy states a goal such as average response time or percentile response time for a class of transactions and a relative importance for that work. Transaction-based work is the primary workload managed in this approach. Although resources are managed to attempt to meet the stated goals, this approach is different from the consumption-based approach described above. In this approach, the concept of a performance index is used. An example would be, given an average response time goal, that the performance index could be calculated by dividing the actual average response time of completed transactions by the goal. One commercial embodiment of this approach is the IBM Workload Manager (WLM) for z/OS. WLM for z/OS allows the management of single-hop transactions (a notion to be further described below) to a goal-based policy.

While WLM for z/OS effectively manages workloads for which it was originally designed, it is limited to managing transactions over only a single hop, meaning that the response time for a transaction is measured between two points within the same process or (to use the z/OS term) address space. The global response time for a particular type of transaction is then merely the sum of the response times for all of the processes that are supporting this type of transaction.

A number of previously issued patents describe this goal-oriented approach. U.S. Pat. No. 5,504,894 (Ferguson et al.), entitled "Workload manager for achieving transaction class response time goals in a multiprocessing system", defines a performance index based on the complete response time of transactions. However, it does not deal with the problem of understanding the contribution of individual components of a multi-tiered application to overall (i.e., end-to-end) performance. U.S. Pat. No. 5,675,739 (Eilert et al.), entitled "Apparatus and method for managing a distributed data processing system workload according to a plurality of distinct processing goal types", and U.S. Pat. No. 6,230,183 (Yocom et al.), entitled "Method and apparatus for controlling the number of servers in a multisystem cluster", describe a "local performance index". However, these two patents envision a group of systems, each of which completely processes a transaction, since each transaction is only a single hop. Thus the definition of "local performance index" is still based on the complete response time of the transaction, and it is local in the sense that it is based on the view of one system rather than the group of systems.

For a group of transactions running in a multi-tier, multi-system environment, it is relatively easy to determine the average response time for the collection of transactions by measuring the time for a transaction between creation and completion for each transaction and dividing by the number of transactions. Trying to estimate what the impact would be to the overall end-to-end performance by changing resources allocated to the servers or determining the bottleneck is more difficult. A view of the transactions from the point of view of a particular server in a particular tier is required.

U.S. Patent Application Publication 2005/0021736 (Carusi et al.), entitled "Method and system for monitoring performance of distributed applications", describes the tagging of transactions using mechanisms provided by the Application Response Measurement (ARM) standard. Thus a particular transaction can be tracked through each hop that does work for a particular transaction. The published application describes collecting response time data for each transaction at each hop and at some fixed interval all the transaction response time data is forwarded from the servers to a central point. Give the information collected, a complete view of each transaction can be constructed from the individual hop data for the transaction using the identification information provided by ARM. Therefore, given the knowledge of which specific machines that the transaction flowed through at each hop, it is possible to assemble a collection of only those transactions that flowed through a particular server and, using those transaction's end-to-end response time, a local performance index can be calculated.

This approach implements a mechanism to allow the selection of which transactions to instrument with ARM on the fly due to the overhead of maintaining all of the transaction records at each server, forwarding all of this information to a central point and the processing of all the records. It would be desirable, however, to be able to monitor all transactions efficiently without requiring transfer of the volume of data needed for this approach.

SUMMARY OF THE INVENTION

The present invention contemplates a method and apparatus for calculating a performance measurement for a particular server for a subset of total transactions of a particular type that are flowing through that server. The environment in which this would typically be used is a multi-tiered application environment with multiple systems at each tier. The performance measurement is referred to herein as the local performance index and represents what the overall end-to-end performance would be if all servers that had the hops that are local to this one were performing exactly the same as the one it is calculated for. Once a local performance index is calculated then it is possible to estimate the changes that will occur in the local performance index by prioritization or adding/removing resources for that system. The projected changes in local performance index can then be factored into the end-to-end performance of all transactions of this type and a projection can be made to the performance achieved vs. the goal.

More particularly, the present invention contemplates a method, apparatus and computer program product for obtaining a local performance measure for a particular server in a particular tier in a transaction environment in which transactions pass through multiple tiers with multiple servers at each tier. In accordance with the invention, a total end-to-end response time is obtained for a set of transactions, the total having a contribution from the particular server and a contribution from outside the particular tier. The contribution from the particular server is then scaled by the ratio of transactions passing through the particular tier to transactions passing through the particular server to obtain a scaled contribution from the particular tier. This scaled contribution from the particular tier is then added to the contribution from outside the particular tier to obtain a modified total end-to-end response time from the perspective of the particular server.

This modified total end-to-end response time may be divided by the number of transactions in the set to obtain as the local performance measure a modified average end-to-end response time from the perspective of the particular server. The obtained local performance measure may in turn be used to control allocation of resources to the particular server; such use would typically involve determining the net change in the local performance measure resulting from an allocation of resources to or from the particular server.

The present invention makes it possible to determine, in a multiple-hop transaction environment, where the performance issues are and what the impact will be on end-to-end response time for the collection of transactions if changes are made in a particular instance at a particular hop. Additionally, when one hop is supported by multiple replicated servers, it is important that bad performance of one server not be masked by good performance by it peers.

The local performance index of the present invention provides a view of the performance of the transactions would be if all servers in the tier that the system of interest is in where performing the same as this system. This prevents a single server that is performing poorly from being masked by other servers in the same tier that are performing well. In addition, the contribution of a particular server to the total end-to-end response time can be determined and the impact on resources changes on performance can be evaluated. And in contrast to the system described in the above-identified application of Carusi et al., the present invention allows for all transactions to be monitored efficiently and does not require the transfer of a large volume of data.

The present invention is preferably implemented in software running on conventional computer hardware using conventional interconnection hardware. However, in general the present invention may be implemented in hardware (including microcode), software running on such conventional hardware, or some combination of the two. When implemented in software or microcode, the implementation may take the form of a computer program product including a computer-readable program of instructions on a computer-usable storage medium for implementing the method of the invention. In such software or microcode implementation, the software portions of the various elements recited in the appended apparatus claims (including means elements, if any) correspond to the program instructions on such computer-usable medium for performing the steps in question.

DETAILED DESCRIPTION OF THE INVENTION

Figure 1:
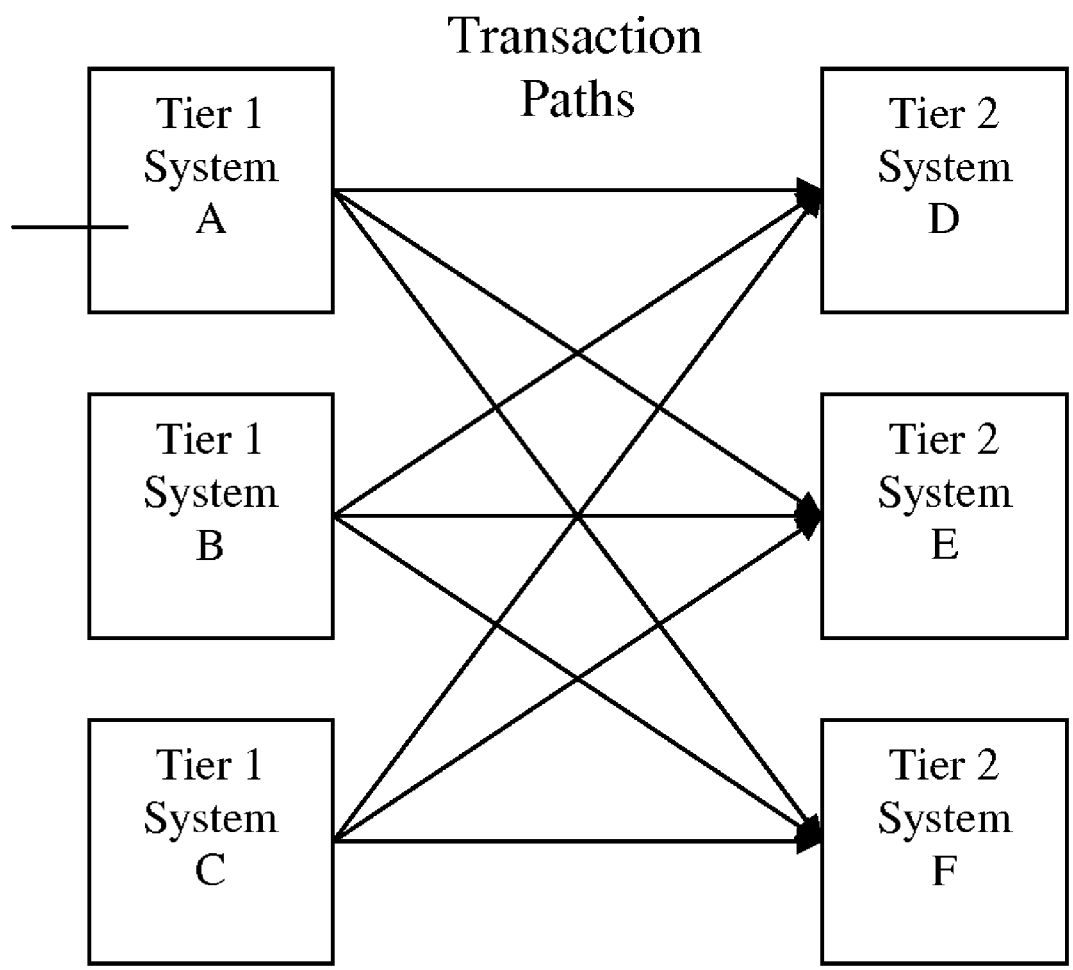
FIG. 1 shows an example of an environment in which the present invention may be used.

FIG. 1 shows an example of an environment in which the present invention may be used. More particularly, FIG. 1 shows an environment with two tiers (tier 1 and tier 2), with three servers (systems A, B and C) in tier 1 as well as three servers (systems D, E, and F) in tier 2 and with interconnections between servers in different tiers. (Unless otherwise indicated, the terms "server" and "system" are used interchangeably herein.) Each of the nodes depicted in FIG. 1 may comprise a general-purpose computer (or a logical partition in such a general-purpose computer) having a central processing unit (CPU), an operating system, and one or more applications. Since these elements function in a generally conventional manner except as described below, they have not been separately shown. For the sake of the discussion below, there are only two tiers in the path that a transaction takes and only three servers in each tier. However, in general there is no limitation on the number of tiers that could exist or the number of servers in each tier, and the figure is only an example of a possible configuration. A single transaction could pass through any server in tier 1 and any server in tier 2. A transaction is not limited to passing through any tier just once, but it is assumed that all transactions will pass through the same topology of tiers.

Figure 2:
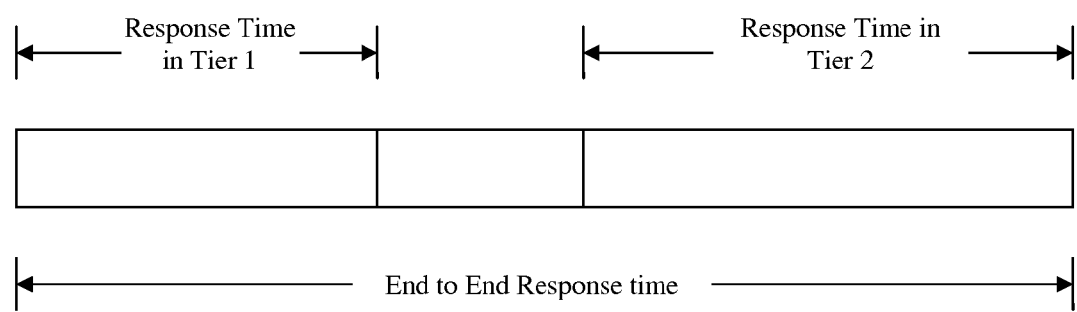
FIG. 2 shows an example of a multi-tier transaction measurement.

FIG. 2 shows an example of a transaction measurement. There are a number of measurements that can be used to describe a transaction for the purposes of performance measurement. Thus, as shown in the figure, there is end-to-end response time, which is the time interval from the first point that the response time can be measured to the time that the transaction completes. A transaction completes when a response is returned to the starting point of the transaction. As also shown in FIG. 2, a similar response time can be measured for each of the tiers.

Figure 3:
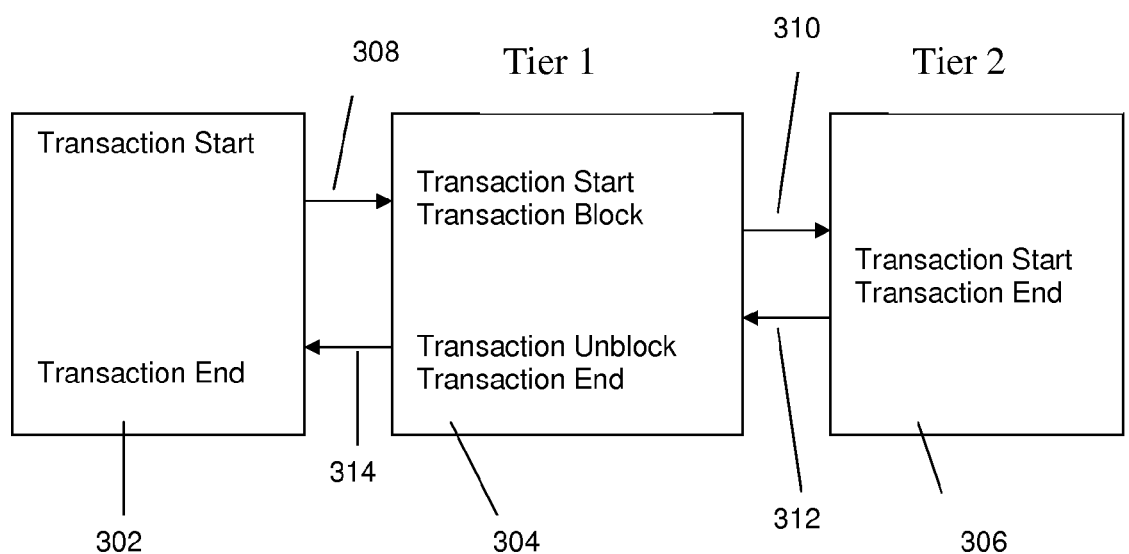
FIG. 3 shows a typical instrumentation environment that may be used to obtain response time measurements for an overall transaction and each of the tiers a transaction traverses.

FIG. 3 shows a typical instrumentation environment that may be used to obtain response time measurements for an overall transaction and each of the tiers a transaction traverses. One example of an instrumentation environment such as this is the well-known Application Response Measurement (ARM) interface. The current version of this interface, ARM 4.0, Version 2, is described in *Application Response Measurement (ARM) Issue* 4.0, *V2—C Binding*, Catalog number C041, December 2004, and *Application Response Measurement (ARM) Issue* 4.0, *V2—Java Binding*, Catalog number C042, December 2004. The publications, which are available online from The Open Group, are incorporated herein by reference.

More particularly, FIG. 3 shows a transaction initiated by a client 302 that runs through a tier 1 server 304 and a tier 2 server 306 (collectively, "nodes"). Client 302 initiates the transaction by sending a suitable request message 308 to tier 1 server 304. At some point in the transaction, tier 1 server 304 utilizes the services of tier 2 server 306 to complete the transaction by sending a request message 310 to tier 2 server 306. Upon completing its portion of the transaction, tier 2 server 306 sends a response message 312 to tier 1 server 304. Finally, tier 1 server 304, upon completing its portion of the transaction, sends a response message 314 back to client 302, completing the transaction.

Using, for example, the interface provided by ARM, nodes 302, 304 and 306 (more particularly, the applications on these nodes handling the transaction) mark various points in their handling of the transaction. Thus, client 302 may issue an arm_start service call to mark the start of the transaction ("Transaction Start") and an arm_stop service call to mark the end of the transaction ("Transaction End"). Similarly, tier 1 server 304 may issue an arm_start service call to mark the start of its handling of the transaction ("Transaction Start"), an arm_block service call to mark the beginning of the time that it is blocked awaiting a response from tier 2 server 306 ("Transaction Block"), an arm_unblock service call to mark the end of this period ("Transaction Unblock"), and an arm_stop service call to mark the end of its handling of the transaction ("Transaction End"). Finally, tier 2 server 306 may issue an arm_start service call to mark the start of its handling of the transaction ("Transaction Start") and an arm_stop service call to mark the end of its handling of the transaction ("Transaction End").

Referring to FIG. 2 again, the end-to-end response time represents the time between Transaction Start and Transaction End for client 302. The tier 1 response time represents the time between Transaction Start and Transaction End for tier 1 server 304, less the time between Transaction Block and Transaction Unblock (since the latter interval is not attributable to tier 1 server delays). Similarly, the tier 2 response time represents the time between Transaction Start and Transaction End for tier 2 server 306; there is no blocked time to be deducted here since tier 2 server handles its part of the transaction entirely by itself. The remaining portion of the end-to-end response time depicted, not part of either the tier 1 response time or the tier 2 response time, represents such delays as the transit times between nodes 302, 304 and 306.

In what follows, "overall" or "end-to-end" generally means that the measurement in question is taken over the entirety of tiers and connections therebetween, while "total" means that the measurement is taken over the entirety of a set of transactions.

Figure 4:
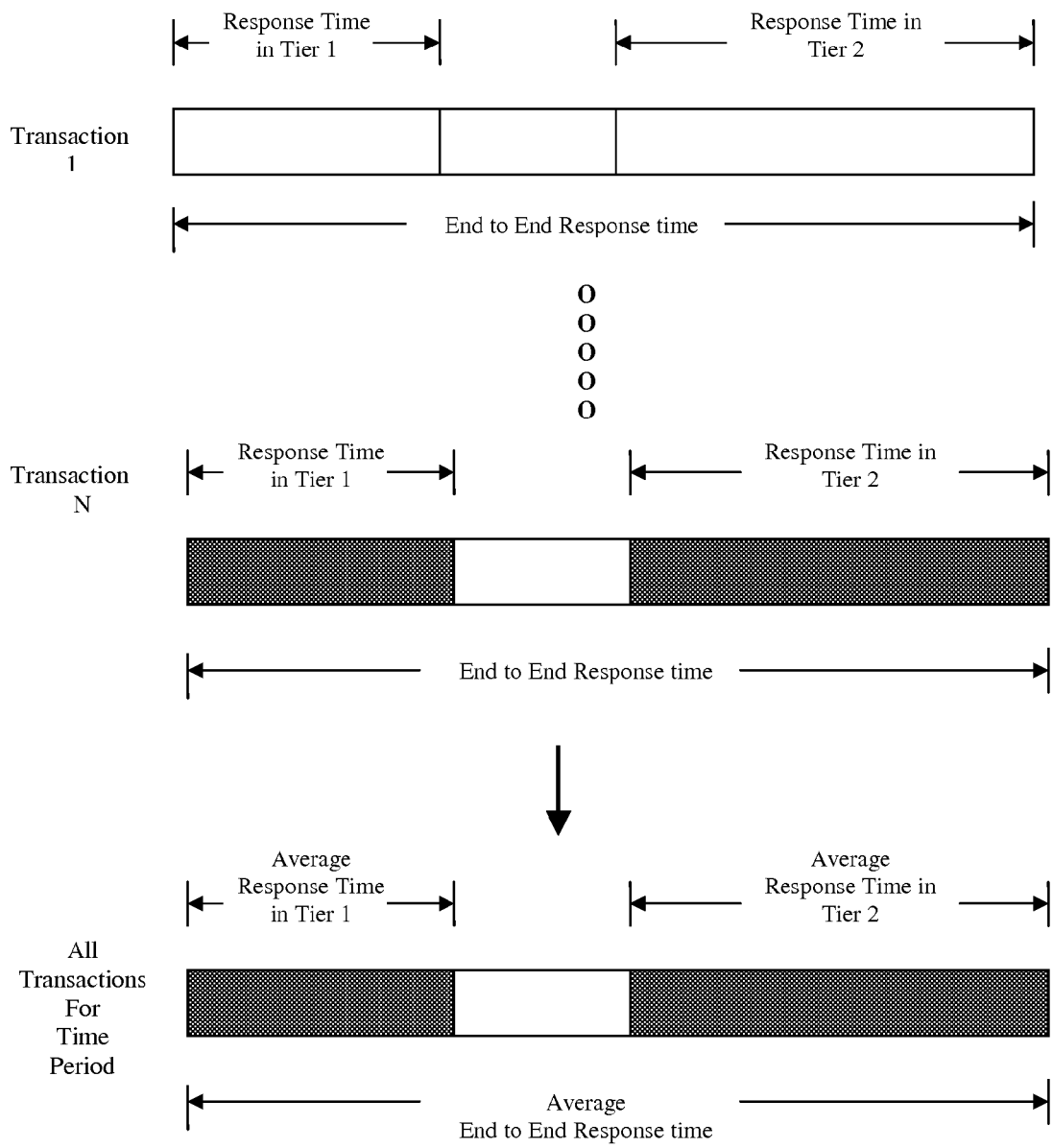
FIG. 4 shows the derivation of the average end-to-end response time and tier response times from the corresponding response times for individual transactions in a particular time period.

Given that there is information available for each transaction as to the end-to-end response time and the response time for each tier, an average for each can be calculated by taking the total for all transactions over some period of time and dividing by the number of transactions. This is shown in FIG. 4. More particularly, the average end-to-end response time for transactions 1-N is the sum of the end-to-end response times for transactions 1 through N, divided by the number of transactions, N. Similarly, the average response time in tier 1 for transactions 1-N is the sum of the response times in tier 1 for transactions 1 through N, divided by the number of transactions N, while the average response time in tier 2 for transactions 1-N is the sum of response times in tier 2 for transactions 1 through N, divided by N.

Figure 5:
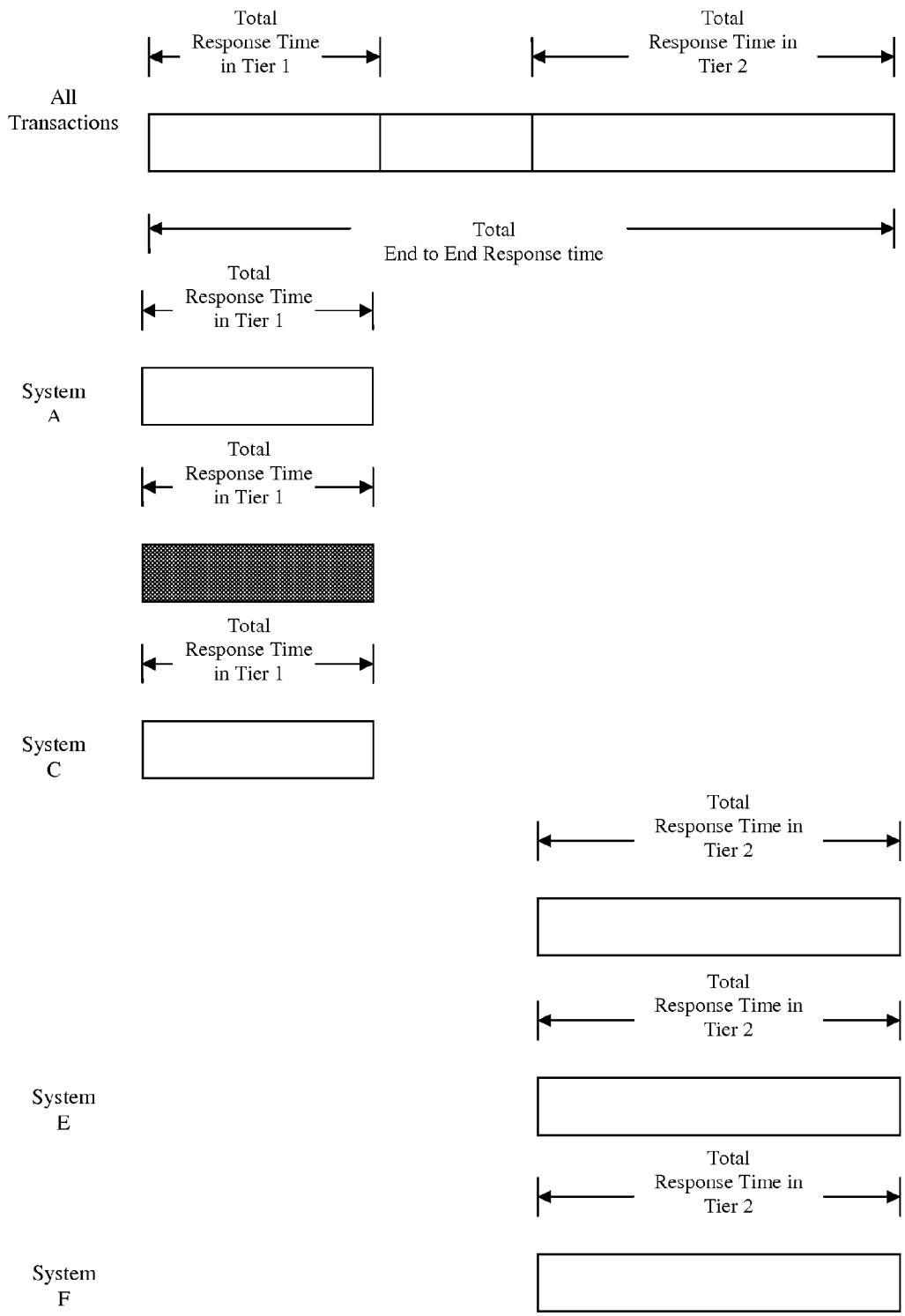
FIG. 5 shows the decomposition of the total response time into total response times for particular servers.

FIG. 5 shows another way of looking at the contribution of each transaction. The total response time over a period of time includes the sum of the contributions by each system for the same period of time. Times for transactions that run on a particular system for a particular tier are summed to arrive at the total response time for that tier on that system. Thus, as shown in the figure, for an ensemble of transactions, the total response time in tier 1 for systems A, B and C (FIG. 1) is the sum of the total response times for each of those systems in tier 1 for those transactions, while the total response time in tier 2 for systems D, E and F is the sum of the total response times for each of those systems in tier 2 for those transactions. As with FIG. 4, the average response time for each transaction can be derived by taking the total response time and dividing by the number of transactions for that period of time.

Figure 6:
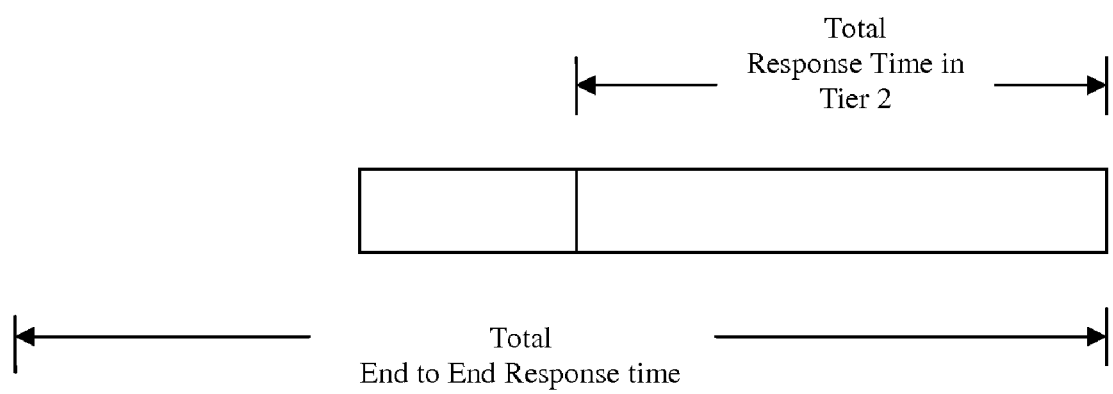
FIG. 6 shows the removal from the total end-to-end response time of the contribution of a particular server tier to that response time.

For a particular tier the contribution of all systems in that tier to the total response time can be removed from the total end-to-end response time. As a particular example, FIG. 6. shows the removal from the end-to-end response time of the contribution of tier 1 to that response time. More particularly, FIG. 6 shows only the tier 2 component and the non-tier component resulting from such contributions as transit delays between nodes. The figure thus shows the "extra-tier" portion of the end-to-end response time, attributable to elements outside of tier 1.

With this as background, in accordance with the present invention, the performance from a local point of view for a tier on a particular system (in this case, tier 1) is then calculated by scaling the contribution of the response time of that particular system at that tier by the total number of transactions at that tier divided by the number of transactions for that particular system. For example, if the contribution of system A in tier 1 (FIG. 1) to the total end-to-end response time is 200 milliseconds (ms) and there are 300 transactions passing through tier 1, 50 of which pass through system A, then the scaled total response time in tier 1 for system A is 200×300/50=1200 ms. This represents in effect what the total response time in tier 1 would be if all systems in tier 1 had the same average response time as system A (in this case, 200/50=4 ms).

Figure 7:
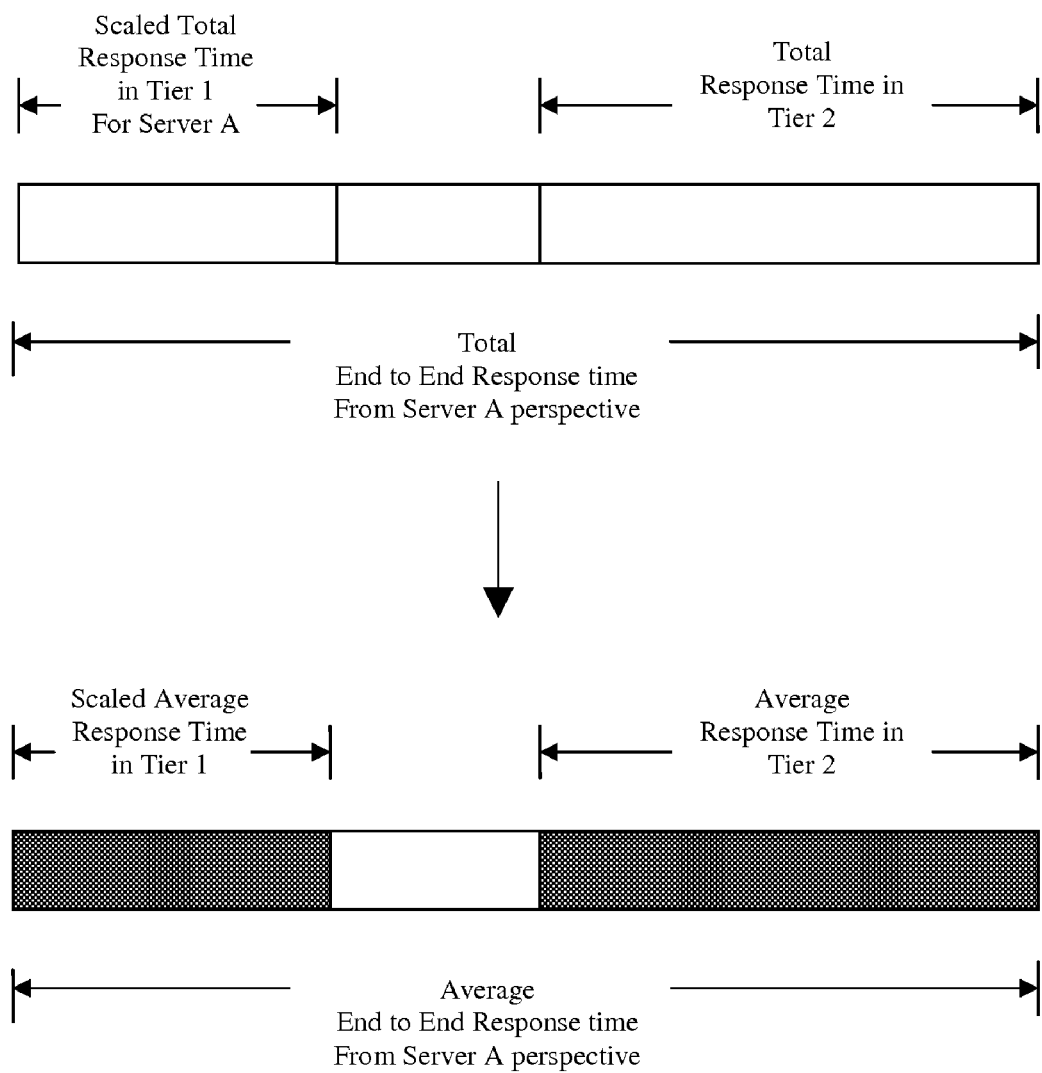
FIG. 7 shows the addition of the scaled contribution from the particular tier to the contribution from outside the particular tier to obtain a modified total end-to-end response time from the perspective of the particular server.

FIG. 7 shows the inclusion of the scaled total response time for the tier 1 hop on server A. The total response time in tier 2 and the unattributed "extra-tier" portion of the total end-to-end response time (representing transit delays and the like)

that are depicted in FIG. 7 have the same values as in FIG. 6. The total response time in tier 1, however, has been scaled for system A in the manner described above. Given that we know the total number of transactions, then an average end-to-end response time can be calculated, which is shown at the bottom of FIG. 7.

The overall procedure, therefore, for calculating a local performance index for a particular server in a particular tier, is as follows:

1. Obtain the total end-to-end response time for a set of transactions, as well as the contributions of the particular server and the particular tier to that total end-to-end response time (FIG. 5).
2. Subtract from that total end-to-response time the contribution of the particular tier to obtain the extra-tier total response time (FIG. 6).
3. Scale the contribution of the particular server by number of transactions passing through the particular tier, divided by the number of transactions passing through the particular server, to obtain a scaled total response time in the particular tier for the particular server (FIG. 7).
4. Add the scaled total response time from step 3 to the extra-tier total response time from step 2 to obtain the total end-to-end response time from the perspective of the particular server in the particular tier (FIG. 7).
5. Divide the total end-to-end response time by the number of transactions in the set to obtain the average end-to-end response time from the perspective of the particular server in the particular tier.

This local performance index and similarly calculated ones for other systems may then be used to determine resource allocations between a donor system and a receiver system with which it shares resources. To facilitate this, each system first determines the relationship between the amount of resources allocated to it and its performance index. From this relationship, the net change in the performance index of each system resulting from the allocation of resources from the donor system to the receiver system can be determined. Only if the net (positive) change in the performance index of the receiver system is greater than the net (negative) change on the performance index of the donor system is the decision made to transfer resources from the donor system to the receiver system. This decision may be made either on a peer-to-peer basis, as described in U.S. Pat. No. 6,587,938 (Eilert et al.), entitled "Method, system and program products for managing central processing unit resources of a computing environment" and incorporated herein by reference, or on a centralized basis as described in the above-identified related application of Jeffery D. Aman et al.

While a particular embodiment has been shown and described, it will be apparent to those skilled in the art that various modifications can be made.

What is claimed is:

1. A method for obtaining a local performance measure for a particular server in a particular tier in a transaction environment in which transactions pass through multiple tiers with multiple servers at each tier, comprising the steps of:
    obtaining a total end-to-end response time for a set of transactions;
    obtaining a contribution from the particular server, a contribution from the particular tier, and a contribution from outside the particular tier to the total end-to-end response time;
    scaling the contribution from the particular server by a ratio of transactions passing through the particular tier to transactions passing through the particular server to obtain a scaled contribution from the particular tier;
    adding the scaled contribution from the particular tier to the contribution from outside the particular tier to obtain a modified total end-to-end response time from the perspective of the particular server.

2. The method of claim 1, further comprising the step of:
    dividing the modified total end-to-end response time by the number of transactions in the set to obtain as the local performance measure a modified average end-to-end response time from the perspective of the particular server.

3. The method of claim 2, further comprising the step of:
    using the obtained local performance measure to control allocation of resources to the particular server.

4. The method of claim 3, the step of using the obtained local performance measure to control allocation of resources to the particular server comprising the step of:
    determining a net change in the local performance measure resulting from an allocation of resources to or from the particular server.

5. A computer program product comprising a computer-readable program of instructions on a computer-usable storage medium for implementing a method comprising the steps of claim 1.

6. The computer program product of claim 5, the method further comprising the step of:
    dividing the modified total end-to-end response time by the number of transactions in the set to obtain as the local performance measure a modified average end-to-end response time from the perspective of the particular server.

7. The computer program product of claim 6, the method further comprising the step of:
    using the obtained local performance measure to control allocation of resources to the particular server.

8. The computer program product of claim 7, the step of using the obtained local performance measure to control allocation of resources to the particular server comprising the step of:
    determining a net change in the local performance measure resulting from an allocation of resources to or from the particular server.

9. Apparatus for obtaining a local performance measure for a particular server in a particular tier in a transaction environment in which transactions pass through multiple tiers with multiple servers at each tier, comprising:
    means for obtaining a total end-to-end response time for a set of transactions, said total having a contribution from the particular server and a contribution from outside the particular tier;
    means for obtaining a contribution from the particular server, a contribution from the particular tier, and a contribution from outside the particular tier to the total end-to-end response time;
    means for scaling the contribution from the particular server by a ratio of transactions passing through the particular tier to transactions passing through the particular server to obtain a scaled contribution from the particular tier;
    means for adding the scaled contribution from the particular tier to the contribution from outside the particular tier to obtain a modified total end-to-end response time from the perspective of the particular server.

10. The apparatus of claim 9, further comprising:
means for dividing the modified total end-to-end response time by the number of transactions in the set to obtain as the local performance measure a modified average end-to-end response time from the perspective of the particular server.

11. The apparatus of claim 10, further comprising:
means for using the obtained local performance measure to control allocation of resources to the particular server.

12. The apparatus of claim 9, the means for using the obtained local performance measure to control allocation of resources to the particular server comprising:

means for determining a net change in the local performance measure resulting from an allocation of resources to or from the particular server.

\* \* \* \* \*